(12) United States Patent
Ouyang et al.

(10) Patent No.: US 9,971,227 B2
(45) Date of Patent: May 15, 2018

(54) TM OPTICAL SWITCH BASED ON SLAB PHOTONIC CRYSTALS WITH HIGH DEGREE OF POLARIZATION AND LARGE EXTINCTION RATIO

(71) Applicant: Zhengbiao Ouyang, Shenzhen, Guangdong Province (CN)

(72) Inventors: Zhengbiao Ouyang, Shenzhen (CN); Guohua Wen, Shenzhen (CN)

(73) Assignee: ZHENGBIAO OUYANG, Shenzhen, Guangdong Province (CN)

( * ) Notice: Subject to any disclaimer, the term of this patent is extended or adjusted under 35 U.S.C. 154(b) by 0 days. days.

(21) Appl. No.: 15/620,801

(22) Filed: Jun. 12, 2017

(65) Prior Publication Data

US 2017/0285439 A1    Oct. 5, 2017

Related U.S. Application Data

(63) Continuation of application No. PCT/CN2015/097051, filed on Dec. 10, 2015.

(30) Foreign Application Priority Data

Dec. 10, 2014  (CN) .......................... 2014 1 0756881

(51) Int. Cl.
    *G02F 1/313*    (2006.01)
(52) U.S. Cl.
    CPC ........ *G02F 1/3133* (2013.01); *G02F 2201/06* (2013.01); *G02F 2202/32* (2013.01); *G02F 2203/07* (2013.01)
(58) Field of Classification Search
    CPC ............... G02F 1/3133; G02F 2202/32; G02F 2203/07; G02F 2201/06
    See application file for complete search history.

(56) References Cited

U.S. PATENT DOCUMENTS 8,571,373 B2    10/2013  Wang et al.

FOREIGN PATENT DOCUMENTS

CN    101571657 A    11/2009
CN    104375267 A    2/2015
(Continued)

OTHER PUBLICATIONS

Ming-Chang M. Lee, Dooyoung Hah, Erwin K Lau, Hiroshi Toshiyoshi and Ming Wu, "MEMS-Actuated Photonic Crystal Switches", IEEE Photonics Technology Letters, Jan. 15, 2006, pp. 358-360, vol. 18, No. 2, IEEE.

*Primary Examiner* — John M Bedtelyon
(74) *Attorney, Agent, or Firm* — Cheng-Ju Chiang

(57) ABSTRACT

The present invention discloses a TMOS based on slab PhCs with a high DOP and a large EXR, which comprises an upper slab PhC and a lower slab PhC; the upper slab PhC is called as a first square-lattice slab PhC with a TE bandgap, the unit cell of the first square-lattice slab PhC includes a high-refractive-index rotating-square pillar, a single first flat dielectric pillar and a background dielectric, the first flat dielectric pillar includes a high-refractive-index dielectric pipe and a low-refractive-index dielectric, or a high-refractive-index flat film, or a low-refractive-index dielectric; the lower slab PhC is a second square-lattice slab PhC with a complete bandgap, wherein the unit cell of the second square-lattice slab PhC includes a high-refractive-index rotating-square pillar, a single second flat dielectric pillar and a background dielectric, and a normalized operating frequency of the TMOS with high DOP and large extinction ratio is 0.252 to 0.267.

13 Claims, 9 Drawing Sheets

(56) References Cited

FOREIGN PATENT DOCUMENTS

| | | |
|---|---|---|
| CN | 104459988 A | 3/2015 |
| CN | 104459989 A | 3/2015 |
| CN | 104459990 A | 3/2015 |
| CN | 104459991 A | 3/2015 |
| WO | 03/014010 A1 | 2/2003 |
| WO | 2016/091192 A1 | 6/2016 |

TM OPTICAL SWITCH BASED ON SLAB PHOTONIC CRYSTALS WITH HIGH DEGREE OF POLARIZATION AND LARGE EXTINCTION RATIO

This application claims priority to Chinese Application No. 201410756881.X filed on Dec. 10, 2014 and Continuation of Application No. PCT/CN2015/097051 filed on Dec. 10, 2015 and published in Chinese as International Publication No. WO/2016/091192 on Jun. 16, 2016, the entire contents of which are hereby incorporated by reference.

FIELD OF THE INVENTION

The present invention relates to a transverse-magnetic optical switch with a high degree of polarization and a large extinction ratio, and particularly to a transverse-magnetic optical switch based on absolute photonic bandgaps slab photonic crystals with a high degree of polarization and a large extinction ratio.

BACKGROUND OF THE INVENTION

In recent years, with the advent of information age, the speed and amount of information required for communication technology increase dramatically. Optical communication technologies add wings to the information age, but the information processing of nodes and routes still need electronic circuits at present, which restricts the development of communication technologies in terms of speed, capacity and power consumption. Adopting photonic integrated circuits to replace or partially replace electronic integrated circuits for communication routes certainly will become the future direction of development.

A photonic crystal is a structure material in which dielectric materials are arranged periodically in space, and is usually an artificial crystal consisting of two or more materials having different dielectric constants.

The electromagnetic modes in an absolute photonic bandgaps cannot exist completely, so as an electronic energy band is overlapped with the absolute photonic bandgaps of photonic crystals, spontaneous radiation is suppressed. The photonic crystal having the absolute photonic bandgap can control spontaneous radiation, thereby changing the interaction between the fields and materials and further improving the performance of optical devices.

Tunable photonic bandgaps can be applied to information communication, display and storage. For modulating at high speeds by using external driving sources, many solutions have been proposed, e.g., controlling magnetic permeability by using a ferromagnetic material, and changing dielectric constant by using a ferroelectric material.

Most of the existing optical switches are realized by using a nonlinear effect, which requires the use of high-power light for control, thus it will inevitably consume a large amount of energy. In the presence of large-scale integrated system and a large number of communication users, the consumption of energy will become enormous. At the same time, the degree of polarization will affect signal-to-noise ratio and transmission speed.

SUMMARY OF THE INVENTION

The present invention is aimed at overcoming the defects of the prior art and providing a transverse-magnetic optical switch facilitating integration and having slab photonic crystals with a high degree of polarization and a large extinction ratio.

The technical solution adopted by the invention to solve the technical problem is as follows:

A transverse-magnetic (TM) optical switch based on slab photonic crystals (PhCs) with a high degree of polarization (DOP) and a large extinction ratio in the present invention, comprising an upper slab photonic crystal (PhC) and a lower slab PhC connected as a whole; the upper slab PhC is a first square-lattice slab PhC with a transverse-electric (TE) bandgap, the unit cell of the first square-lattice slab PhCs includes a high-refractive-index first rotated-square pillar, a single first flat dielectric plate and a background dielectric, a side length of the high-refractive-index first rotated-square pillar is 0.545a to 0.554a, where a is the lattice constant of the first square-lattice slab PhC; the first flat dielectric plate is arranged horizontally, the first flat dielectric plate enables an overall upper slab PhC to form as a whole, and the first flat dielectric plate includes a high-refractive-index dielectric pipe and a low-refractive-index dielectric in the pipe, or a high-refractive-index flat film, or a low-refractive-index dielectric; a width of the first flat dielectric plate is 0.075a to 0.082a, and the first flat dielectric plate is spaced 0.2a from the same side of a center of the high-refractive-index first rotated-square pillar; the lower slab PhC is a second square-lattice slab PhC with a complete bandgap, the unit cell of the second square-lattice slab PhC includes a high-refractive-index second rotated-square pillar, a single second flat dielectric plate and a background dielectric, the side length of the high-refractive-index second rotated-square pillar is 0.545a to 0.554a, where a is the lattice constant of the second square-lattice slab PhC; the second flat dielectric plate is arranged horizontally, the second flat dielectric plate enables an overall lower slab PhC to form as a whole, and the second flat dielectric plate is a high-refractive-index dielectric plate; the width of the second flat dielectric plates is 0.075a to 0.082a, and the second flat dielectric plate is spaced 0.2a from the same side of a center of the high-refractive-index second rotated-square pillar, the background dielectric of said first and second square-lattice slab PhCs are respectively low-refractive-index dielectric; and a normalized operating frequency of the TM optical switch with a high DOP and a large EXR is 0.252 to 0.267.

The thickness of a pipe wall in the first flat dielectric plate in the unit cell of the first square-lattice slab PhC is 0-0.004a; and a width of the low-refractive-index dielectric in the pipe is the difference between the width of the first flat dielectric plate and a thickness of the pipe.

The normalized operating frequency of the TM optical switch is 0.252 to 0.267, a TM polarization EXR is −19 dB to −22 dB, the highest DOP reaches 96.5%, a TE wave within the operating band is prevented, and an isolation degree (ISD) is −20 dB to −36 dB.

Positions of the first and second square-lattice slab PhCs in the optical channel (OCH) are adjusted by external forces, including mechanical, electrical and magnetic forces.

The rotated angles of the first and second square-lattice slab PhCs are respectively 16.01 to 35.04 degrees and 55 to 66.83 degrees.

The TM optical switch has one state that the first square-lattice slab PhC is located in an OCH and said second square-lattice slab PhC is located outside the OCH.

The second square-lattice slab PhC is located outside the OCH is the optically connected state.

The TM optical switch has another state that the second square-lattice slab PhC is located in the OCH and said first square-lattice slab PhC is located outside the OCH.

The first square-lattice slab PhC is located outside the OCH is another optically disconnected state.

The high-refractive-index dielectric plate is a dielectric with a refractive index of more than 2.

The high-refractive-index dielectric plate is silicon, gallium arsenide, or titanium dioxide.

The low-refractive-index dielectric of said first and second square-lattice slab PhCs are dielectric with a refractive index of less than 1.5.

The low-refractive-index dielectric of the first and second square-lattice slab PhCs are vacuum, air, cryolite, silica, organic foam, or olive oil.

Compared with the prior art, the present invention has the following positive effects.

1. The transverse-magnetic optical switch is an indispensable component in an integrated optical circuit is very important for high-speed operation of a network, and large bandwidth, low energy loss, high degree of polarization and high extinction ratio are important parameters for evaluating switches.

2. The functions of the transverse-magnetic optical switch are realized by adjusting the positions of the first square-lattice slab photonic crystal (the upper slab photonic crystal) and the second square-lattice slab photonic crystal (the lower slab photonic crystal) in the optical channel.

3. The structure of the present invention enables a transverse-magnetic optical switch with high degree of polarization and a large extinction ratio.

4. The transverse-magnetic optical switch with a high degree of polarization and a large extinction ratio based on slab photonic crystals facilitates integration.

These and other objects and advantages of the present invention will become readily apparent to those skilled in the art upon reading the following detailed description and claims and by referring to the accompanying drawings.

These and other objects and advantages of the present invention will become readily apparent to those skilled in the art upon reading the following detailed description and claims and by referring to the accompanying drawings.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

The present invention will be further described in detail below in combination with the accompanying drawings and specific embodiments.

Figure 1A:
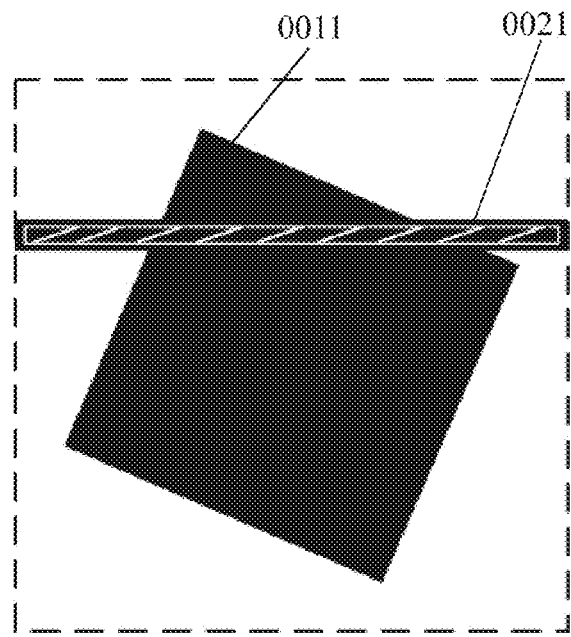
FIG. 1A is a structural schematic diagram of the unit cell of an upper slab photonic crystal of the transverse-magnetic optical switch based on slab photonic crystals with a high degree of polarization and a large extinction ratio of the present invention.
Figure 1B:
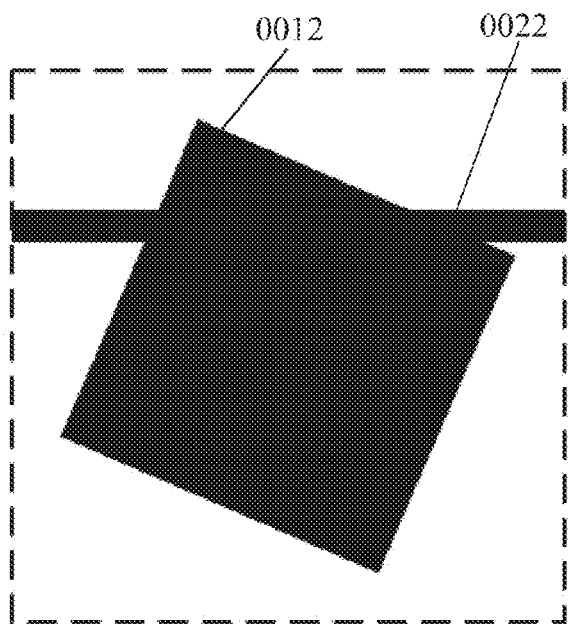
FIG. 1B is a structural schematic diagram of a unit cell of a lower slab photonic crystal of the transverse-magnetic optical switch based on slab photonic crystals with a high degree of polarization and a large extinction ratio of the present invention.

A transverse-magnetic (TM) optical switch with a high degree of polarization (DOP) and a large extinction ratio (EXR) based on slab photonic crystals (PhCs) in the present invention, as shown in FIG., 1A includes an upper slab photonic crystal (PhC) and a lower slab PhC connected as a whole; the upper slab PhC is a first square-lattice slab PhC with a transverse-electric (TE) bandgap the unit cell of the first square-lattice slab PhC includes a high-refractive-index first rotated-square pillar 0011, a single first flat dielectric plate 0021 and a background dielectric, the first flat dielectric plate 0021 is arranged horizontally, the first flat dielectric plate 0021 enables the overall upper slab PhC to form as a whole, and the first flat dielectric plate 0021 includes a high-refractive-index dielectric pipe and a low-refractive-index dielectric in the pipe, or a high-refractive-index flat film, or a low-refractive-index dielectric, the background dielectric of the first square-lattice slab PhC is a low-refractive-index dielectric, and the low-refractive-index dielectric of the first square-lattice slab PhC is vacuum, air, cryolite, silica, organic foam, or olive oil, and the low-refractive-index dielectric of the first square-lattice slab PhC is a different dielectric having a refractive index of less than 1.5. As shown in FIG. 1B, the lower slab PhC is a second slab square-lattice slab PhC with a complete bandgap, the unit cell of the second square-lattice slab PhC includes a high-refractive-index second rotated-square pillar 0012, a single second flat dielectric plate 0022 and a background dielectric, the second dielectric plate 0022 is arranged horizontally, the second flat dielectric plate 0022 enables the overall lower slab PhC to form as a whole, the second flat dielectric plate 0022 is a high-refractive-index dielectric plate, and the high-refractive-index dielectric plate is silicon, gallium arsenide, or titanium dioxide, and the high-refractive-index dielectric is a different dielectric having a refractive index of more than 2; the background dielectric of the second square-lattice slab PhC is a low-refractive-index dielectric, and the low-refractive-index dielectric of the second square-lattice slab PhC is vacuum, air, cryolite, silica, organic foam, or olive oil, and the low-refractive-index dielectric of the second square-lattice slab PhC is a different dielectric having a refractive index of less than 1.5. The normalized operating frequency (a/λ) of the TM optical switch with a high DOP and a large EXR is 0.252 to 0.267, and this operating band is either the TE bandgap and TM transmission band of the first square-lattice slab PhC and the complete bandgap of the second square-lattice slab PhC, or the complete bandgap of the second square-lattice PhC slab and the TE bandgap and TM transmission band of the first square-lattice slab PhC, wherein a is a lattice constant of the first and second square-lattice slab PhCs, and λ is the wavelength of incident wave.

For an normalized operating frequency (a/λ) of the TM optical switch (TM mode optical switch) being 0.252 to 0.267, the TM polarization EXR is −19 dB to −22 dB, the highest DOP is greater than 96.5%, the TE wave within the operating band is prevented, and the isolation degree (ISD) is −20 dB to −36 dB; the state that the first square-lattice slab PhC is located in the optical channel (OCH) and the second square-lattice slab PhC is located outside the OCH is a first switch state of the TM optical switch with a high DOP and a large EXR, i.e., optically connected state; and the state that the second square-lattice slab PhC is located in the OCH and the first square-lattice slab PhC is located outside the OCH is a second switch state of the TM optical switch with a high DOP and a large EXR, i.e., optically disconnected state.

The EXR of the TM optical switch is a ratio of the output optical powers of the TM optical switch in the two states, i.e., optically connected state and optically disconnected state, and the DOP of the TM optical switch refers to a ratio of optical power difference to optical power sum of the TE wave and the TM wave at the output end in the switch ON state.

The first implementation of the TM optical switch (TM mode optical switch) with a high DOP and a large EXR based on slab PhCs.

Figure 2A:
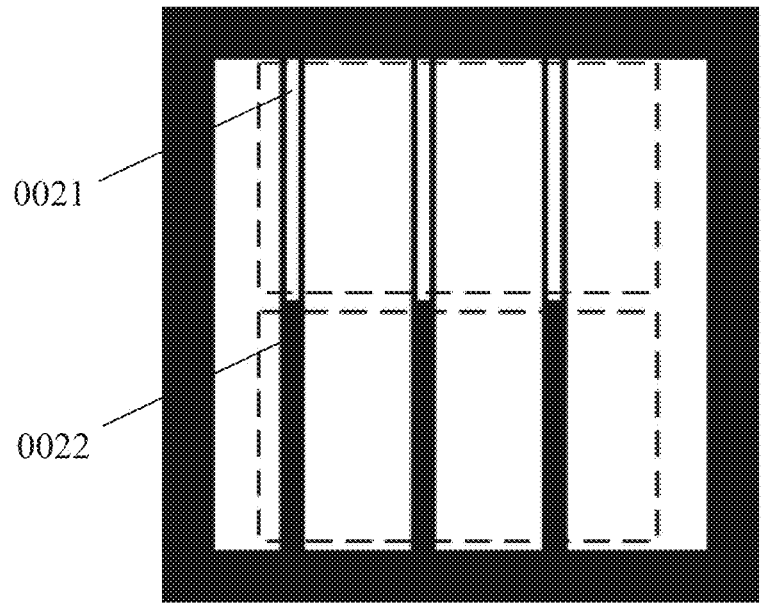
FIG. 2A is a structural schematic diagram of a first implementation of the transverse-magnetic optical switch with a high degree of polarization and a large extinction ratio based on slab photonic crystals as shown in FIGS. 1A and 1B.

The TM optical switch includes an upper slab PhC and a lower slab PhC connected as a whole; as shown in FIG. 2A, the high-refractive-index first and second rotated-square pillars in PhC are omitted in the figure, and the dashed box shows the position of the high-refractive-index first and second rotated-square pillars array; the upper slab PhC is a first square-lattice slab PhC with a TE bandgap, the unit cell of the first square slab lattice PhC includes a high-refractive-index first rotated-square pillar, a single first flat dielectric plate 0021 and a background dielectric, the first flat dielectric plate 0021 is arranged horizontally, the first flat dielectric plate 0021 enables the overall upper slab PhC to form as a whole, the first flat dielectric plate 0021 includes a high-refractive-index dielectric pipe and a low-refractive-index dielectric in the pipe, the first flat dielectric plate is spaced 0.2a from the center of the high-refractive-index first rotated-square pillar. The side length of the high-refractive-index first rotated-square pillar is 0.545a to 0.554a, and the width of the first flat dielectric plate is 0.075a to 0.082a., the rotated angle of the first square-lattice slab PhC is 16.01 to 35.04 degrees; the thickness of the pipe wall in the first flat dielectric plate 0021 in the unit cell of the first square-lattice slab PhC is 0 to 0.004a, where a is the lattice constant of the first square-lattice slab PhC; and the width of the low-refractive-index dielectric in the pipe is the difference between the width of the first flat dielectric plate 0021 and the thickness of the pipe. The lower slab PhC is a second square-lattice slab PhC with a complete bandgap, the unit cell of the second square-lattice slab PhC includes a high-refractive-index second rotated-square pillar, a single second flat dielectric plate 0022 and a background dielectric, the second flat dielectric plate 0022 is arranged horizontally, the second flat dielectric plate 0022 enables the overall lower slab PhC to form as a whole, and the second flat dielectric plate 0022 of the second square-lattice slab PhC is spaced 0.2a from the center of the high-refractive-index second rotated-square pillar. The side length of the high-refractive-index second rotated-square pillar of the second square-lattice slab PhC is 0.545a to 0.554a, the rotated angle of the second square-lattice slab PhC is 55 to 66.83 degrees, the width of the second flat dielectric plate 0022 of the second square-lattice slab PhC is 0.075a to 0.082a; the second flat dielectric plate 0022 is a high-refractive-index dielectric plate, the high-refractive-index dielectric plate is silicon, gallium arsenide, or titanium dioxide, and the second flat dielectric plate is a different dielectric having a refractive index of more than 2, and the high-refractive-index dielectric plate adopts a silicon material; the background dielectric of the first and second square-lattice slab PhCs are respectively low-refractive-index dielectric, and the first and second square-lattice slab PhCs low-refractive-index dielectric are vacuum, air, cryolite, silica, organic foam, or olive oil, and the first and second square-lattice slab PhCs are different dielectric having a refractive index of less than 1.5. The normalized operating frequency (a/λ) of the TM optical switch with a high DOP and a large EXR is 0.252 to 0.267, and this frequency band is either the TM transmission band and TE bandgap of the first square-lattice slab PhC and the complete bandgap of the second square-lattice slab PhC, or the TM transmission band and TE bandgap of the second square-lattice slab PhC and the complete bandgap of the firsts square-lattice slab PhC, wherein a is a lattice constant of the first and second square-lattice slab PhCs, and λ is the wave length of incident wave. The TM polarization EXR is −19 dB to 22 dB, the highest DOP reaches 96.5%, the TE wave within the operating band is prevented, and the ISD is −20 dB to −36 dB.

The second implementation of the TM optical switch (TM mode optical switch) with a high DOP and a large EXR based on slab PhCs.

Figure 2B:
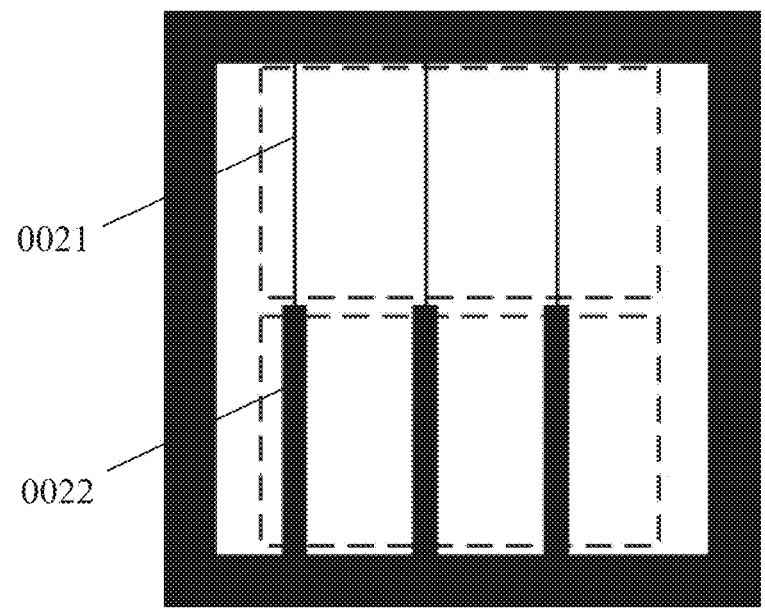
FIG. 2B is a structural schematic diagram of a second implementation of the transverse-magnetic optical switch with a high degree of polarization and a large extinction ratio based on slab photonic crystals as shown in FIGS. 1A and 1B.

The TM optical switch includes an upper slab PhC and a lower slab PhC connected as a whole; as shown in FIG. 2B, the high-refractive-index first and second rotated-square pillars in PhC are omitted in the figure, and the dashed box shows the position of the high-refractive-index first and second rotated-square pillars array; the upper slab PhC is a first square-lattice slab PhC with a TE bandgap, the unit cell of the first square-lattice slab PhC includes a high-refractive-index first rotated-square pillar, a single first flat dielectric plate 0021 and a background dielectric, the first flat dielectric plate 0021 is arranged horizontally, the first flat dielectric plate 0021 enables the overall upper slab PhC to form as a whole, and the first flat dielectric plate 0021 includes a high-refractive-index flat film; the first flat dielectric plate 0021 is spaced 0.2a from the center of the high-refractive-index first rotated-square pillar, the side length of the high-refractive-index first rotated-square pillar of the first square-lattice slab PhC is 0.545a to 0.554a, and the width of the first slab dielectric plate 0021 of the first square-lattice slab PhC is 0.075a to 0.082a, the rotated angle of the first square-lattice slab PhC is 16.01 to 35.04 degrees; the lower slab PhC is a second square-lattice slab PhC with a complete bandgap, the unit cell of the second square-lattice slab PhC includes a high-refractive-index second rotated-square pillar, a single second flat dielectric plate 0022 and a background dielectric, the second flat dielectric plate 0022 is arranged horizontally, the second flat dielectric plate enables the overall lower slab PhC to form as a whole, the second flat dielectric plate 0022 of the second square-lattice slab PhC is spaced 0.2a from the center of the high-refractive-index second rotated-square pillar, the side length of the high-refractive-index second rotated-square pillar of the second square-lattice slab PhC is 0.545a to 0.554a, the rotated angle of the second square-lattice slab PhC is 55 to 66.83 degrees, and the width of the second flat dielectric plate 0022 of the second square-lattice slab PhC is 0.075a to 0.082a. The second flat dielectric plate 0022 is a high-refractive-index dielectric plate, the high-refractive-index dielectric plate is silicon, gallium arsenide, or titanium dioxide, and the high-refractive-index dielectric plate is a different dielectric having a refractive index of more than 2, and the high-refractive-index dielectric plate adopts a silicon material; the background dielectric of the first and second square-lattice slab PhCs are respectively low-refractive-index dielectric, and the low-refractive-index dielectric is vacuum, air, cryolite, silica, organic foam, or olive oil, and the first and second square-lattice slab PhCs are different dielectric having a refractive index of less than 1.5. The normalized operating frequency (a/λ) of the TM optical switch with a high DOP and a large EXR is 0.252 to 0.267, and this frequency band is either the TM transmission band and TE band gap of the first square-lattice slab PhC and the complete bandgap of the second square-lattice slab PhC, or the TM transmission band and TE bandgap of the second square-lattice slab PhC and the complete bandgap of the first square-lattice slab PhC, wherein a is a lattice constant of the first and second square-lattice slab PhCs, and λ, is the wavelength of incident wave. The TM polarization EXR is −19 dB to −22 dB, the highest DOP reaches 96.5%, the TE wave within the operating band is prevented, and the ISD is −20 dB upto −36 dB.

The three implementations of the TM optical switch (TM mode optical switch) with a high DOP and a large EXR based on slab PhCs.

Figure 2C:
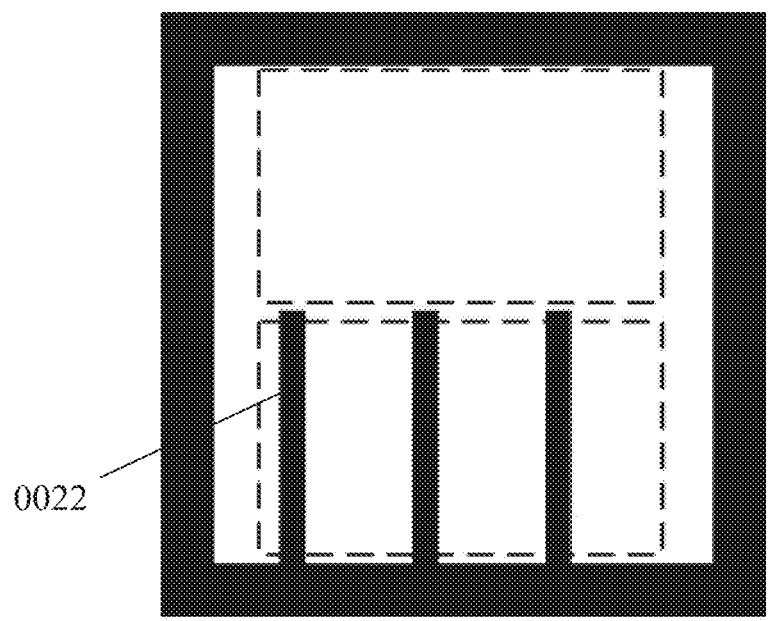
FIG. 2C is a structural schematic diagram of a third implementation of the transverse-magnetic optical switch with a high degree of polarization and a large extinction ratio based on slab photonic crystals as shown in FIGS. 1A and 1B.

The TM optical switch includes an upper slab PhC and a lower slab PhC connected as a whole; as shown in FIG. 2C, the high-refractive-index first and second rotated-square pillars and the first flat dielectric plate in PhC are omitted in the figure, and the dashed box shows the position of the high-refractive-index first and second rotated-square pillars array. The upper slab PhC slab is a first square-lattice slab PhC with a TE bandgap the unit cell of the first square-lattice slab PhC includes a high-refractive-index first rotated-square pillar, a single first flat dielectric plate and a background dielectric, the first flat dielectric plate includes a low-refractive-index dielectric, the first flat dielectric plate of the first square-lattice slab PhC is spaced 0.2 a from the center of the high-refractive-index first rotated-square pillar, the side length of the high-refractive-index first rotated-square pillar of the unit cell of the first square-lattice slab PhC is 0.545a to 0.554a, and the width of the first flat dielectric plate of the first square-lattice slab PhC is 0.075a to 0.082a; the rotated angle of the first square-lattice slab PhC is 16.01 to 35.04 degrees, the background dielectric of the first square-lattice slab PhC is a low-refractive-index dielectric, a slot is formed in the high-refractive-index first rotated-square pillar and is filled with the low-refractive-index dielectric, and the low-refractive-index dielectric of the first square-lattice slab PhC is vacuum, air, cryolite, silica, organic foam, or olive oil, and is a different dielectric having a refractive index of less than 1.5, e.g., the slot is filled with air. The lower slab PhC is a second square-lattice slab PhC with a complete bandgap, the unit cell of the second square-lattice slab PhC includes a high-refractive-index second rotated-square pillar, a single second flat dielectric plate 0022 and a background dielectric, the second flat dielectric plate 0022 is arranged horizontally, the second flat dielectric plate 0022 enables the overall lower slab PhC to form as a whole, the second flat dielectric plate 0022 of the second square-lattice slab PhC is spaced 0.2a from the center of the high-refractive-index second rotated-square pillar, the side length of the high-refractive-index second rotated-square pillar of the unit cell of the second square-lattice slab PhC is 0.545a to 0.554a, the rotated angle of the second square-lattice slab is 55 to 66.83 degrees, and the width of the second flat dielectric plate 0022 of the second square-lattice slab PhC is 0.075a to 0.082a; the second flat dielectric plate 0022 is a high-refractive-index dielectric plate, the high-refractive-index dielectric plate is silicon, gallium arsenide, or titanium dioxide, and is a different dielectric having a refractive index of more than 2, and the high-refractive-index dielectric plate adopts a silicon material; the background dielectric of the second square-lattice slab PhC is a low-refractive-index dielectric; the normalized operating frequency (a/λ) of the TM optical switch with a high DOP and a large EXR is 0.252 to 0.267, and this frequency band is either the TM transmission band and TE band gap of the first square-lattice slab PhC and the complete bandgap of the second square-lattice slab PhC, or TM transmission band and TE bandgap the of the second square-lattice slab PhC and the complete bandgap of the first square slab lattice PhC, wherein a is a lattice constant of the first and second square slab lattice PhCs, and λ is the wavelength of incident wave. The TM polarization EXR is −19 dB to 22 dB, the highest DOP reaches 96.5%, the TE wave within the operating band is prevented, and the ISD is −20 dB to −36 dB.

The afore said three implementations all take a paper surface as the reference plane, and the upper and lower slab PhCs are connected as a whole by a frame and move vertically under the action of external forces to realize the functions of the TM optical switch. Because the frame itself is not on the light input and output planes, i.e., the light input and output planes are parallel to the reference plane, the propagation of light is not influenced. The vertical movement of the upper and lower slab PhCs serving as a whole can be realized by micromechanical, electrical or magnetic forces. For example, a magnet may be embedded into the frame, a pressure linkage device is connected with the frame, the pressure can thus drive the black frame to move up and down, and the left and right sides of the frame are located in a groove guide rail to guarantee that the black frame moves vertically, linearly and reciprocally.

Embodiment 1

Figure 3:
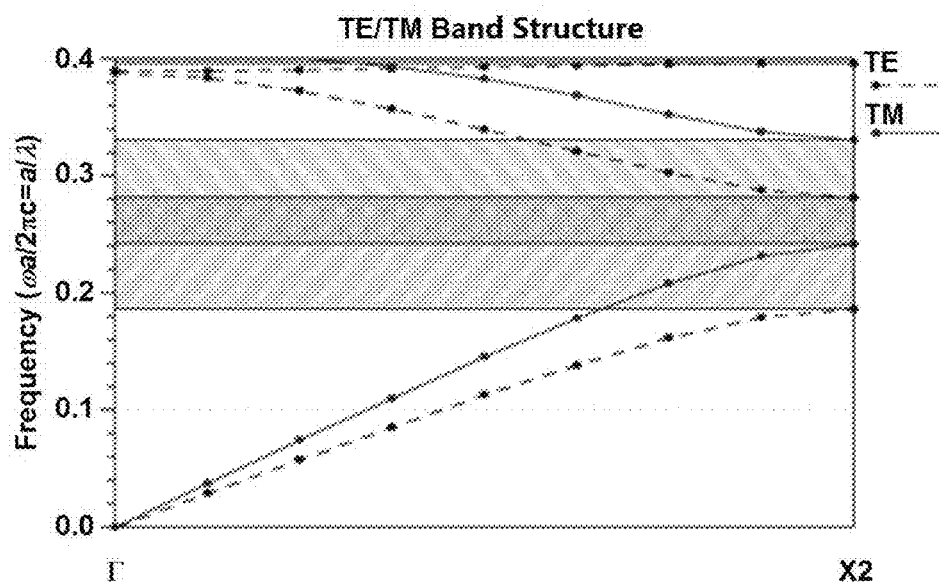
FIG. 3 is a photonic band map structure of the second square-lattice slab photonic crystal shown in embodiment 1.
Figure 4:
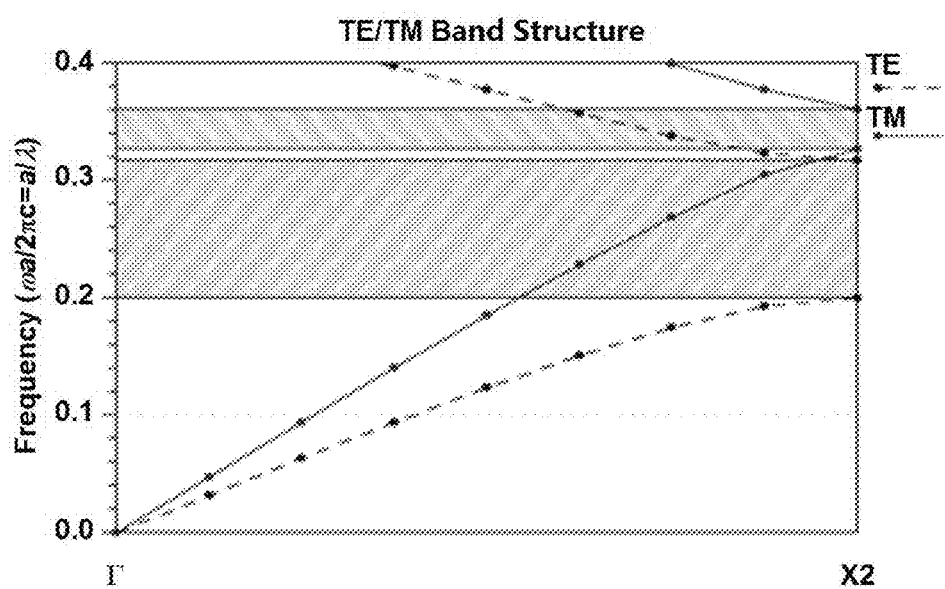
FIG. 4 is a photonic band map structure of the first square-lattice slab photonic crystal shown in embodiment 1.

In this embodiment, different photonic band map structures in a vertical direction are obtained through the first and second square-lattice slab PhCs, FIG. 3 is a photonic band map structure of the second square-lattice slab PhC, FIG. 4 is a photonic band map structure of the first square-lattice slab PhC, and it can be known by comparison that in case that the normalized operating frequency (a/λ) range is 0.242 to 0.281, this structure enables a TM optical switch with a high DOP and a large EXR.

Embodiment 2

Figure 5A:
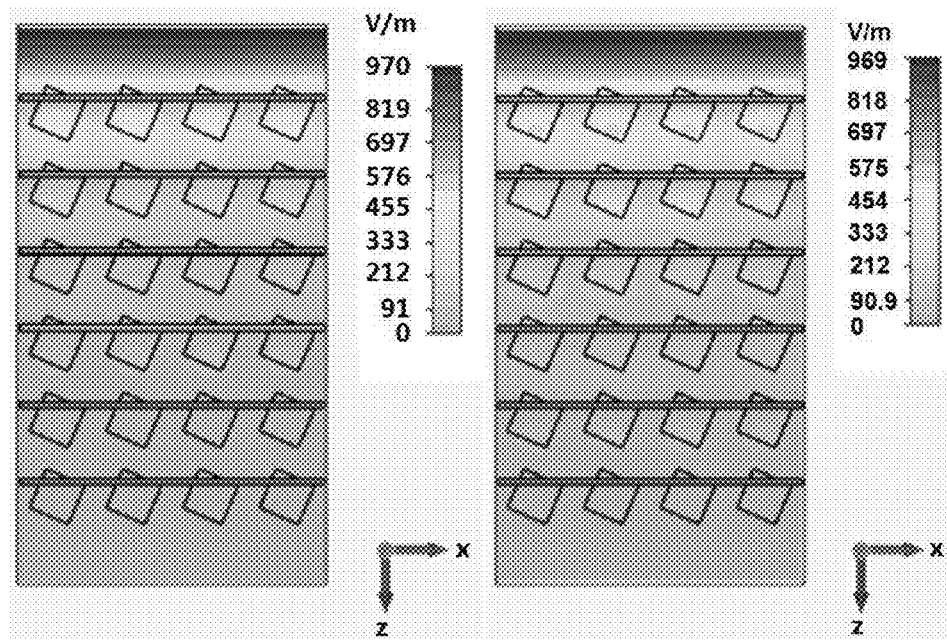
FIG. 5A is a transverse-electric field distribution diagram in the transverse-magnetic optical switch for an normalized operating frequency (a/λ) of 0.252 as shown in embodiment 2.
Figure 5B:
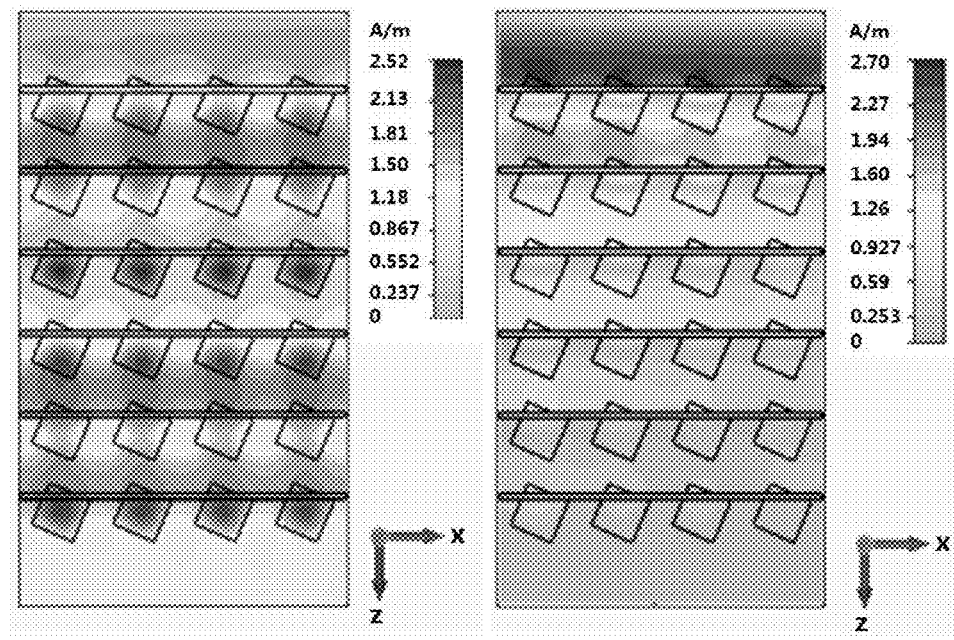
FIG. 5B is a transverse-magnetic field distribution diagram in the transverse-magnetic optical switch for the normalized operating frequency of 0.252 as shown in embodiment 2.

In this embodiment, the normalized photonic operating frequency (a/λ) is 0.252. By adopting the first implementation and verifying with three-dimensional structure parameters for six layers of high-refractive-index rotated dielectric pillars and six layers of high-refractive-index dielectric veins consisting of rotated pillars and connecting plates are included, the result is illustrated in FIG. 5. It can be known from FIG. 5 that: the TM optical switch has a high DOP and good extinction effect.

Embodiment 3

Figure 6A:
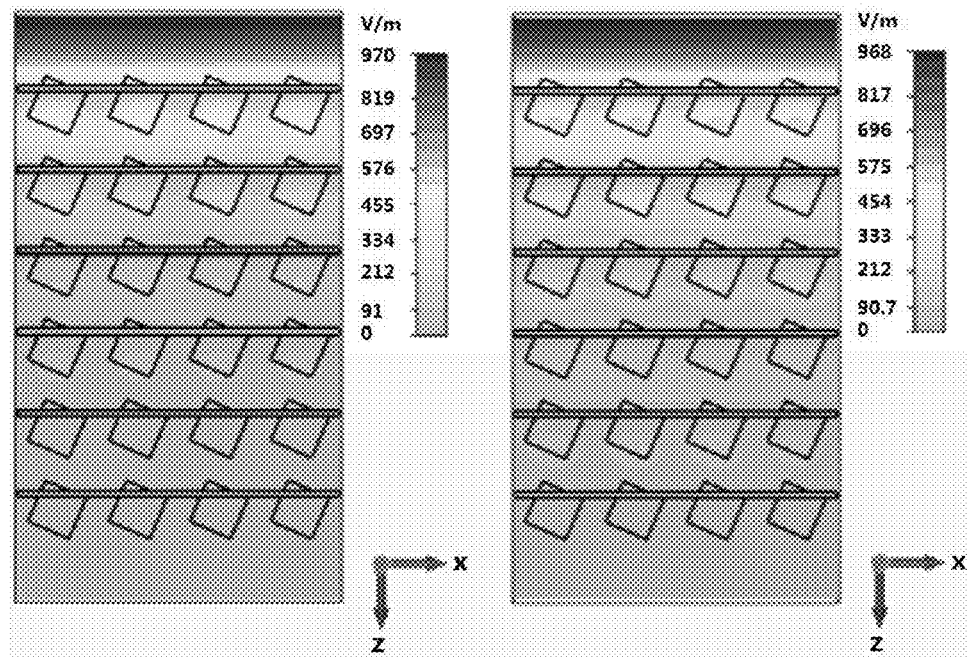
FIG. 6A is a transverse-electric field distribution diagram in the transverse-magnetic optical switch for the normalized operating frequency (a/λ) of 0.253 as shown in embodiment 3.
Figure 6B:
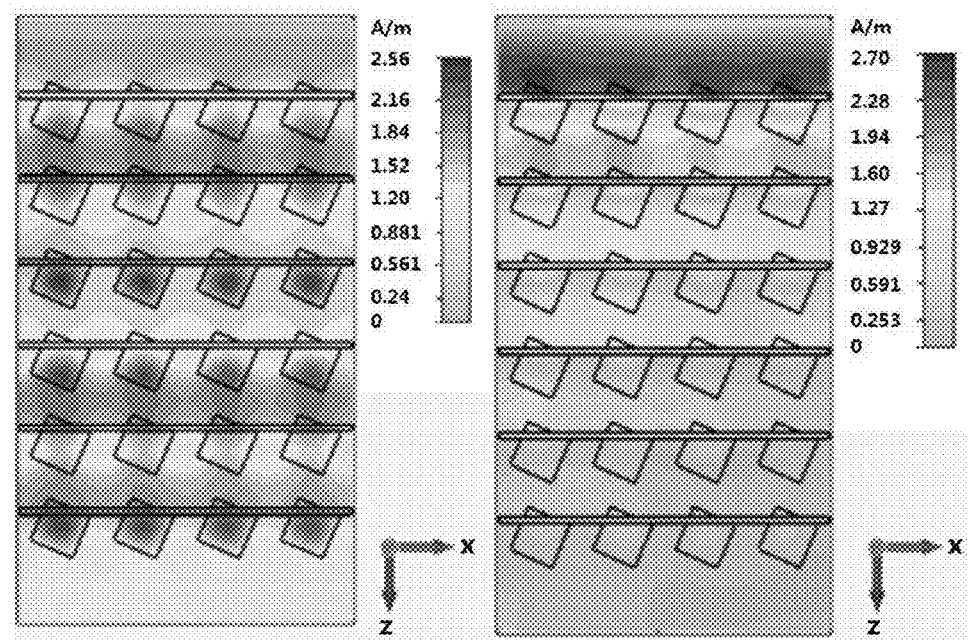
FIG. 6B is a transverse-magnetic field distribution diagram in the transverse-magnetic optical switch for the normalized operating frequency of 0.253 as shown in embodiment 3.

In this embodiment, the normalized photonic operating frequency (a/λ) is 0.253. By adopting the first implementation and verifying with three-dimensional (3D) structure parameters for six layers of high-refractive-index rotated dielectric pillars and six layers of high-refractive-index dielectric veins consisting of rotated pillars and connecting plates are included, the result is illustrated in FIG. 6. It can be known from FIG. 6 that: the TM optical switch has a high DOP and good extinction effect.

Embodiment 4

Figure 7A:
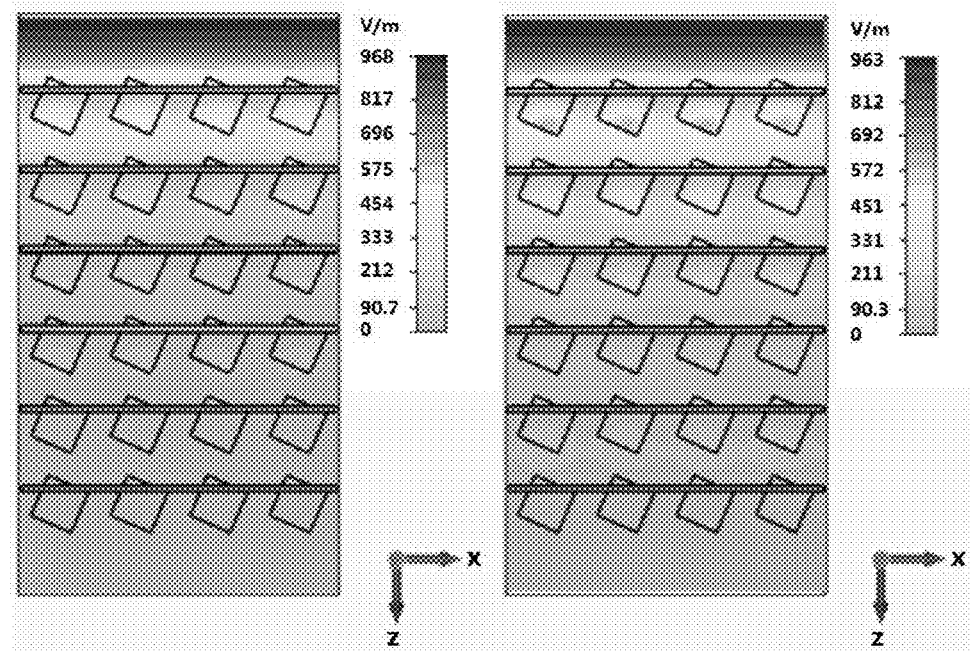
FIG. 7A is a transverse-electric field distribution diagram in the transverse-magnetic optical switch for the normalized operating frequency of 0.257 as shown in embodiment 4.
Figure 7B:
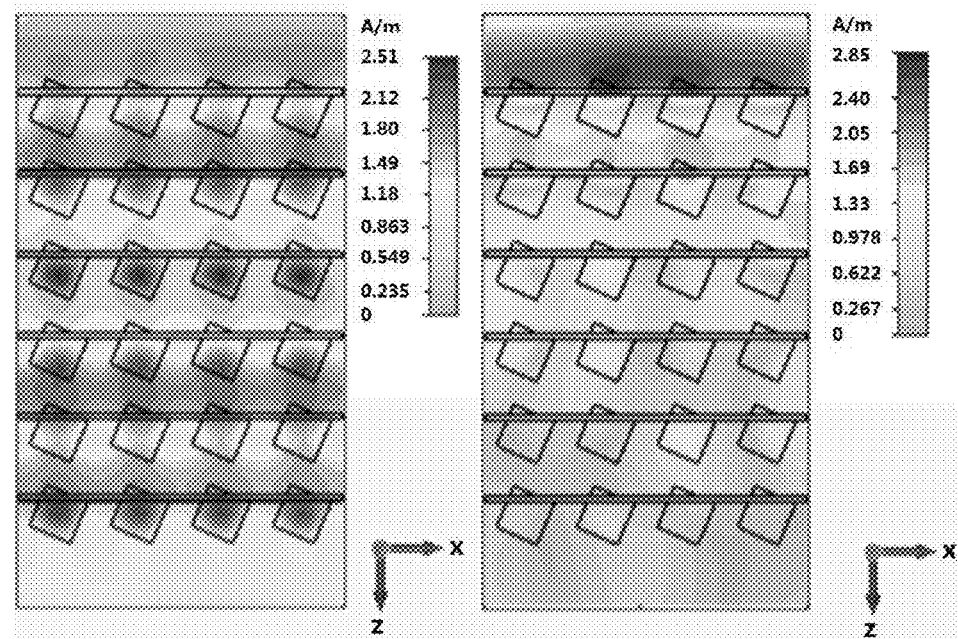
FIG. 7B is a transverse-magnetic field distribution diagram in the transverse-magnetic optical switch for the normalized operating frequency of 0.257 as shown in embodiment 4.

In this embodiment, the normalized photonic operating frequency (a/λ) is 0.257. By adopting the second implementation and verifying with 3D structure parameters for six layers of high-refractive-index rotated dielectric pillars and six layers of high-refractive-index dielectric veins consisting of rotated pillars and connecting plates are included, the result is illustrated in FIG. 7. It can be known from FIG. 7 that: the TM optical switch has a high DOP and good extinction effect.

Embodiment 5

Figure 8A:
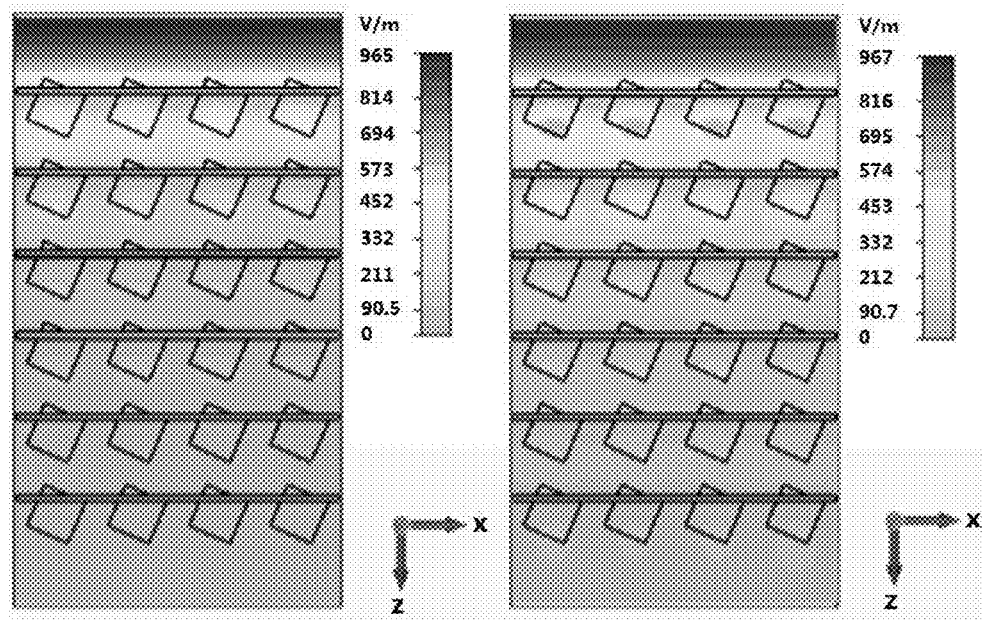
FIG. 8A is a transverse-electric field distribution diagram in the transverse-magnetic optical switch for the normalized operating frequency of 0.26 as shown in embodiment 5.
Figure 8B:
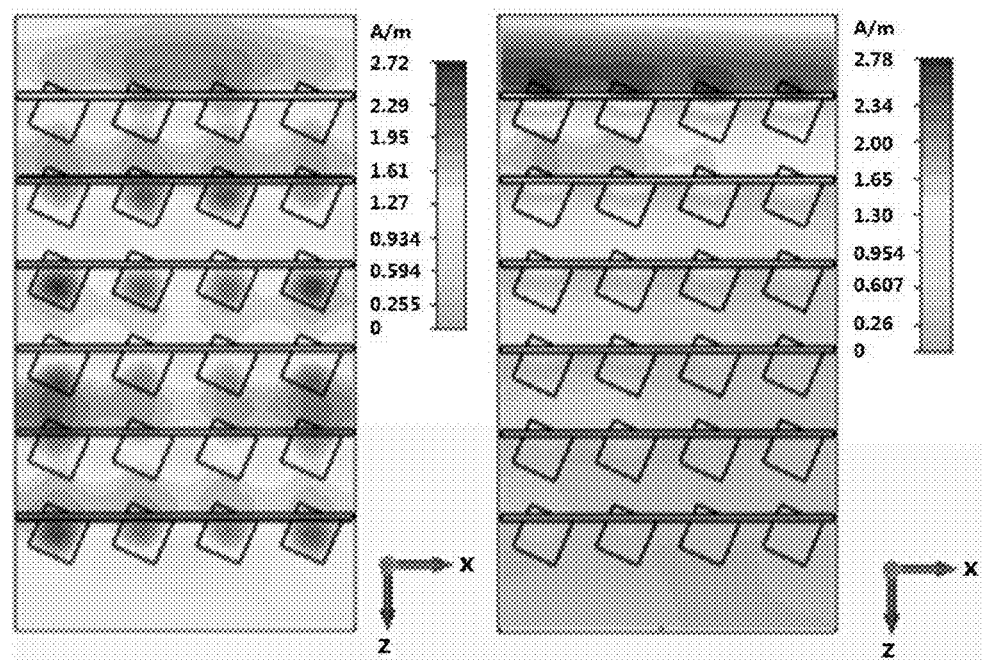
FIG. 8B is an optical field distribution diagram in the transverse-magnetic optical switch for the normalized operating frequency of 0.26 as shown in embodiment 5.

In this embodiment, the normalized photonic operating frequency (a/λ) is 0.26. By adopting the second implementation and verifying with 3D structure parameters for six layers of high-refractive-index rotated dielectric pillars and six layers of high-refractive-index dielectric veins consisting of rotated pillars and connecting plates are included, the result is illustrated in FIG. 8. It can be known from FIG. 8 that: the TM optical switch has a high DOP and good extinction effect.

Embodiment 6

Figure 9A:
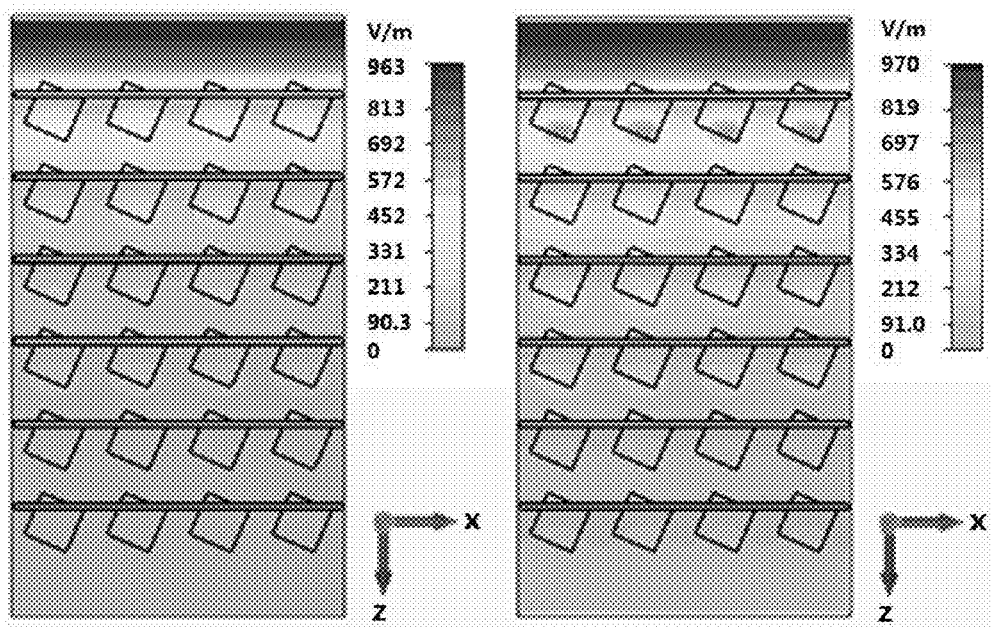
FIG. 9A is a transverse-electric field distribution diagram in the transverse-magnetic optical switch for the normalized operating frequency of 0.267 as shown in embodiment 6.
Figure 9B:
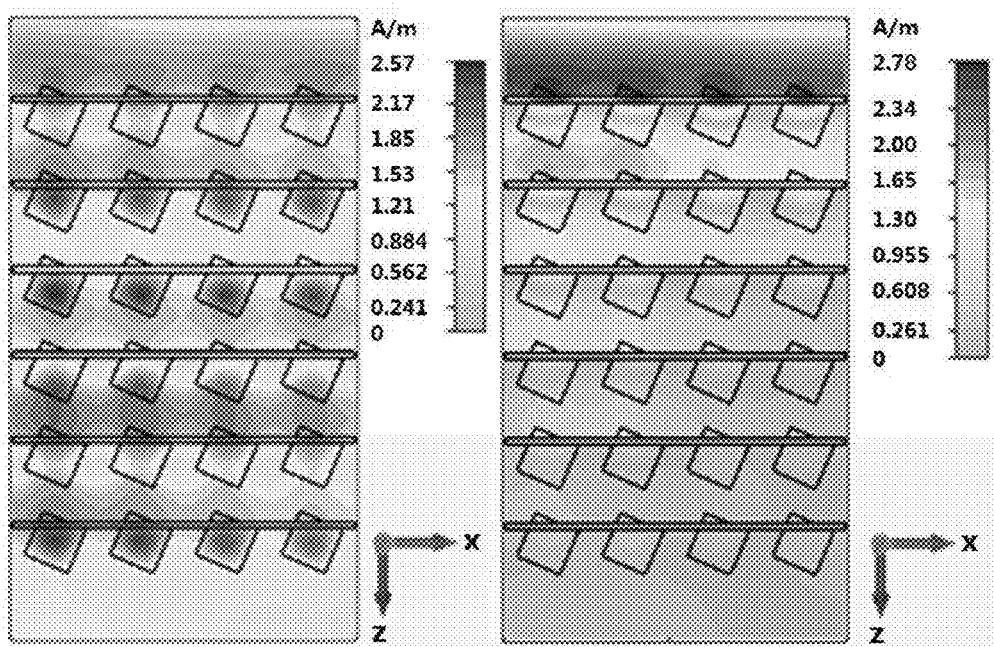
FIG. 9B is a transverse-magnetic field distribution diagram in the transverse-magnetic optical switch for the normalized operating frequency of 0.267 as shown in embodiment 6.

In this embodiment, the normalized photonic operating frequency (a/λ) is 0.267. By adopting the second implementation and verifying with 3D structure parameters for six layers of high-refractive-index rotated dielectric pillars and six layers of high-refractive-index dielectric veins consisting of rotated pillars and connecting plates are included, the result is illustrated in FIG. 9. It can be known from FIG. 9 that: the TM optical switch has a high DOP and good extinction effect.

While the invention has been described in terms of various specific embodiments, those skilled in the art will recognize that the invention can be practiced with modification within the spirit and scope of the claims.

What is claimed is:

1. A transverse-magnetic (TM) optical switch based on slab photonic crystals (PhCs) with a high degree of polarization (DOP) and a large extinction ratio (EXR), wherein said TM optical switch based on slab PhCs with a high DOP and a large EXR, comprising:

an upper slab photonic crystal (PhC) and a lower slab PhC connected as a whole; said upper slab PhC is a first square-lattice slab PhC with a transverse-electric (TE) bandgap, the unit cell of said first square-lattice slab PhC includes a high-refractive-index first rotated-square pillar, a single first flat dielectric plate and a background dielectric, a side length of said high-refractive-index first rotated-square pillar is 0.545a to 0.554a, where a is the lattice constant of the first square-lattice slab PhC; said first flat dielectric plate is arranged horizontally, said first flat dielectric plate enables an overall upper slab PhC to form as a whole, and said first flat dielectric plate includes a high-refractive-index dielectric pipe and a low-refractive-index dielectric in the pipe, or a high-refractive-index flat film, or a low-refractive-index dielectric; a width of said first flat dielectric plate is 0.075a to 0.082a, and said first flat dielectric plate is spaced 0.2a from the same side of a center of said high-refractive-index first rotated-square pillar; and said lower slab PhC is a second square-lattice slab PhC with a complete bandgap, the unit cell of said second square-lattice slab PhC includes a high-refractive-index second rotated-square pillar, a single second flat dielectric plate and a background dielectric, the side length of said high-refractive-index second rotated-square pillar is 0.545a to 0.554a, where a is the lattice constant of the second square-lattice slab PhC; said second flat dielectric plate is arranged horizontally, said second flat dielectric plate enables an overall lower slab PhC to form as a whole, and said second flat dielectric plate is a high-refractive-index dielectric plate; the width of said second flat dielectric plate is 0.075a to 0.082a, and said second flat dielectric plate is spaced 0.2a from the same side of a center of said high-refractive-index second rotated-square pillar, the background dielectric of said first and second square-lattice slab PhCs are respectively low-refractive-index dielectric; and a normalized operating frequency of said TM optical switch with a high DOP and a large EXR is 0.252 to 0.267.

2. The TM optical switch based on slab PhCs with a high DOP and a large EXR, as claimed in claim 1 wherein the thickness of a pipe wall in said first flat dielectric plate in the unit cell of said first square-lattice slab PhC is 0-0.004a; and a width of said low-refractive-index dielectric in the pipe is the difference between the width of said first flat dielectric plate and a thickness of the pipe.

3. The TM optical switch based on slab PhCs with a high DOP and a large EXR, as claimed in claim 1 wherein said normalized operating frequency of said TM optical switch is 0.252 to 0.267, a TM polarization EXR is −19 dB to −22 dB, the highest DOP reaches 96.5%, a TE wave within the operating band is prevented, and an isolation degree is −20 dB to −36 dB.

4. The TM optical switch based on slab PhCs with a high DOP and a large EXR, as claimed in claim 1 wherein positions of said first and second square-lattice slab PhCs in the optical channel (OCH) are adjusted by external forces, including mechanical, electrical and magnetic forces.

5. The TM optical switch based on slab PhCs with a high DOP and a large EXR, as claimed in claim 1 wherein the rotated angles of the first and second square-lattice slab PhCs are respectively 16.01 to 35.04 degrees and 55 to 66.83 degrees.

6. The TM optical switch based on slab PhCs with a high DOP and a large EXR, as claimed in claim 1 wherein said TM optical switch has one state that said first square-lattice slab PhC is located in an OCH and said second square-lattice slab PhC is located outside the OCH.

7. The TM optical switch based on slab PhCs with a high DOP and a large EXR, as claimed in claim 6 wherein said second square-lattice slab PhC is located outside the OCH is the optically connected state.

8. The TM optical switch based on slab PhCs with a high DOP and a large EXR, as claimed in claim 1 wherein said TM optical switch has another state that said second square-lattice slab PhC is located in the OCH and said first square-lattice slab PhC is located outside the OCH.

9. The TM optical switch based on slab PhCs with a high DOP and a large EXR, as claimed in claim 8 wherein said first square-lattice slab PhC is located outside the OCH is another optically disconnected state.

10. The TM optical switch based on slab PhCs with a high DOP and a large EXR, as claimed in claim 1 wherein said high-refractive-index dielectric plate is a dielectric with a refractive index of more than 2.

11. The TM optical switch based on slab PhCs with a high DOP and a large EXR, as claimed in claim 1 wherein said high-refractive-index dielectric plate is silicon, gallium arsenide, or titanium dioxide.

12. The TM optical switch based on slab PhCs with a high DOP and a large EXR, as claimed in claim 1 wherein said low-refractive-index dielectric of said first and second square-lattice slab PhCs are dielectric with a refractive index of less than 1.5.

13. The TM optical switch based on slab PhCs with a high DOP and a large EXR, as claimed in claim 1 wherein said low-refractive-index dielectric of said first and second square-lattice slab PhCs are vacuum, air, cryolite, silica, organic foam, or olive oil.

* * * * *